Patented Apr. 21, 1942

2,280,253

UNITED STATES PATENT OFFICE 2,280,253

DYESTUFFS OF THE METHINE SERIES

Werner Müller, Cologne, and Carl Berres, Leverkusen-Wiesdorf, Germany, assignors to General Aniline & Film Corporation, a corporation of Delaware No Drawing. Application August 1, 1939, Serial No. 287,750. In Germany April 26, 1935

1 Claim. (Cl. 260—240)

The present invention relates to new dyestuffs, more particularly it relates to dyestuffs of the methine series which may be represented by the general formula:

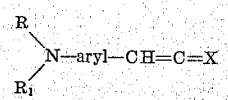

In the said formula R stands for alkyl or hydroxyalkyl, $R_1$ stands for hydrogen, hydroxyalkyl, alkoxyalkyl, aralkyl or aryl. The grouping =C=X stands for the radical of a compound containing a reactive methyl or methylene group bound to a nucleus, in which the =C= portion is formed from the said reactive group and the group

stands in para-position to CH.

The new dyestuffs are obtainable by condensing according the methods known per se a compound with a reactive methyl or methylene group bound to a nucleus with a para-aminoarylaldehyde of the general formula:

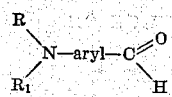

wherein R and $R_1$ mean the same as stated above. As far as these aldehydes are not yet known they can be prepared e. g. according to the process described in U. S. Patent 2,141,090, or in a manner analogous to that described in British specification No. 17,135 of 1898, or according to the method described in Berichte der Deutschen Chemischen Gesellschaft, vol. 60, p. 119.

As suitable compounds with reactive methyl or methylene groups bound to a nucleus there may be mentioned, for example pyrazolones, indolines, alpha-methylindolines, alpha- and gamma-alkyl-pyridines, alkylquinoline, oxythionaphthene, diketohydrindene, acetophenone, dinitrotoluene and so on.

In this manner, new and very clear basic dyestuffs are obtainable, which according to the components employed, are suited for different purposes, as for instance for dyeing of cellulose ethers and esters, for the manufacture of beautiful fast lakes on textiles and substrata, and also as leather dyestuffs.

The invention is illustrated by the following examples, without being restricted thereto, the parts being by weight:

Example 1

17.9 parts of p-N-hydroxyethyl-N-methylaminobenzaldehyde and 17.3 parts of 1.3.3-trimethyl-2-methyleneindoline are dissolved in 35 parts of glacial acetic acid and heated for several hours to 100° C. Thereupon the reaction mass is poured into water and the dyestuff precipitated with sodium chloride. By redissolving the dyestuff from dilute sodium chloride solution it is obtained in crystals, showing a blue surface luster. The dyestuff corresponds to the following formula:

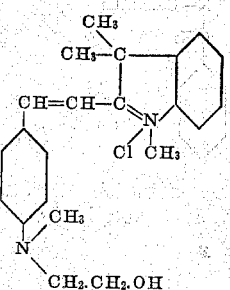

and dyes acetate artificial silk bright red shades of good fastness properties. On cotton mordanted with tannic acid more bluish shades are obtained.

Instead of p-N-hydroxyethyl-N-methylaminobenzaldehyde other aldehydes may be used. Thus with p-N-hydroxyethyl-N-phenylaminobenzaldehyde a dyestuff of the following formula

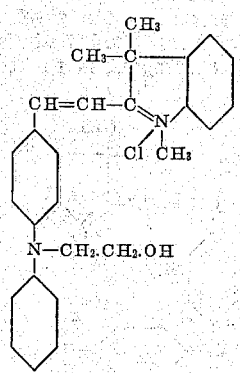

is obtained which is very similar in its appearance and its tinctorial properties to the above dyestuff. It yields on acetate artificial silk a little more bluish shades. With p-N-dihydroxyethylaminobenzaldehyde a dyestuff is obtained dyeing clear red shades. Compared with the shades obtained of the corresponding dyestuff with p-N-hydroxyethyl-N-methyl-aminobenzaldehyde the shades are more yellowish. It shows good tinctorial properties and corresponds to the following formula

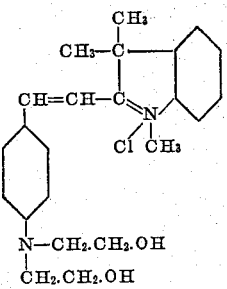

The dyestuff with p-N-ethyl-N-benzylaminobenzaldehyde which corresponds to the following formula

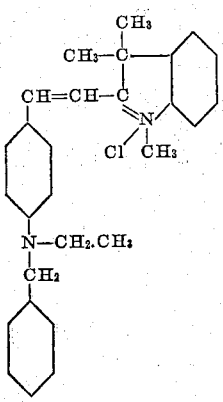

is essentially more bluish than the first mentioned dyestuff, however, in its other properties very similar to it.

*Example 2*

26 parts of p-(N-p'-ethoxyphenyl-N-methylamino)-benzaldehyde are heated together with 24 parts of 1-ethyl-3.3-dimethyl-2-methylene-α-naphthindoline in 75 parts of glacial acetic acid to 100° C. for some hours. The reaction mixture is poured into water and salted out with a saturated solution of sodium phosphate. In this manner there is obtained the dyestuff in green crystals, which are easily soluble in water. The dyestuff dyes, e. g., acetate artificial silk deep violet shades of very good fastness properties. The dyestuff corresponds to the following formula

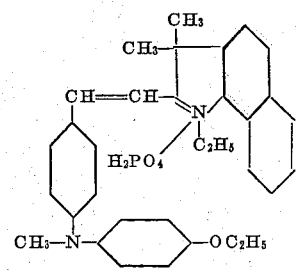

*Example 3*

17.9 parts of p-N-hydroxyethyl-N-methyl-aminobenzaldehyde and 24.9 parts of α-picoline-eth-iodide are dissolved in 45 parts of alcohol. Some pyridine is added and the mixture is heated for several hours with reflux. After some time, when the solution is still warmed, the dyestuff precipitates in fine red crystals. When cold the crystals are sucked off and washed with alcohol. The dyestuff corresponds to the following formula

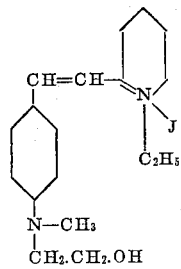

It is sufficiently soluble in water and yields clear reddish yellow shades of good fastness to light and washing.

Instead of p-N-oxethyl-N-methylaminobenzaldehyde other aldehydes may be used. Thus with p-N-hydroxyethyl-N-butylaminobenzaldehyde a brickred crystal powder is obtained which dyes acetate artificial silk clear yellow orange shades, being somewhat more reddish than those obtained with the above dyestuff. Otherwise it shows the same tinctorial properties. It corresponds to the following formula

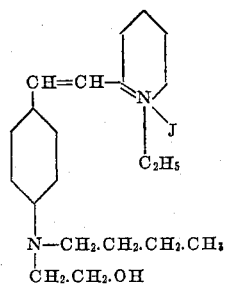

With p-N-hydroxyethyl-N-benzylaminobenzaldehyde likewise a crystallized dyestuff is obtained which corresponds to the following formula

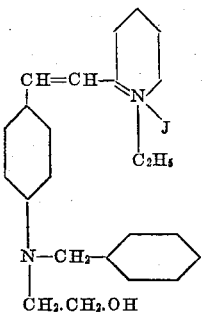

and dyes acetate artificial silk almost pure yellow shades and shows good fastness properties.

When using instead of α-picoline-eth-iodide quinaldine-eth-iodide and condensing it with p-N-hydroxyethyl-N-methylaminobenzaldehyde in the same manner a dark brown crystal powder of the dyestuff of the constitution

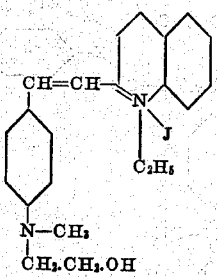

is obtained which dyes acetate artificial silk clear bluish red shades of very good fastness properties.

*Example 4*

17.9 parts of p-N-hydroxyethyl-N-methyl-aminobenzaldehyde and 13.1 parts of α-methylindole (methylketole) are dissolved in 30 parts of glacial acetic acid and heated for several hours to 100° C. Thereupon the reaction mass is poured into water and salted out with sodium chloride. The dyestuff precipitates as fine bluish violet crystal powder. It is sucked off and washed with dilute sodium chloride solution. The dyestuff corresponds to the following formula

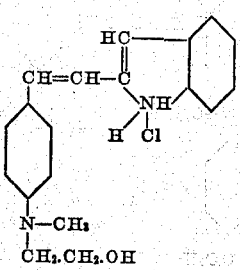

is sufficiently soluble in water and dyes acetate artificial silk clear red violet shades.

*Example 5*

17.9 parts of p-N-hydroxyethyl-N-methyl-aminobenzaldehyde and 15 parts of oxythionaphthene are dissolved in 45 parts of alcohol. A few drops of piperidine are added and the mixture heated for several hours with reflux. After cooling the dyestuff separates as red crystal powder. It is sucked off and washed with alcohol. The dyestuff corresponds to the following formula

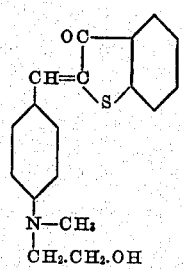

and dyes acetate artificial silk orange red shades of good fastness properties.

In the same way a dyestuff is prepared from p-N-methyl-N-phenylaminobenzaldehyde and oxythionaphthene. It forms red crystals, melting at 139–140° C., corresponds to the following formula

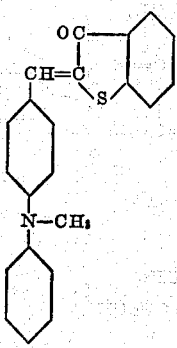

and dyes acetate artificial silk red orange shades of good fastness properties.

*Example 6*

17.9 parts of p-N-hydroxyethyl-N-methyl-aminobenzaldehyde and 18.2 parts of 2.4-dinitrotoluene are mixed with about 3 parts of piperidine and heated for several hours to 100° C. Thereupon 150 parts of alcohol are slowly run with stirring into the reaction mixture. The dyestuff precipitates as dark greenish crystal powder. It is sucked off and washed with alcohol. The dyestuff corresponds to the following formula

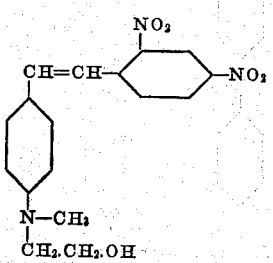

and dyes acetate artificial silk brown red shades.

*Example 7*

17.9 parts of P-N-hydroxyethyl-N-methyl-aminobenzaldehyde and 12 parts of acetophenone are dissolved in 35 parts of alcohol with the addition of 2 drops of concentrated caustic soda lye and heated for several hours with reflux. The dyestuff is precipitated with water and several times digested with hot water. The dyestuff corresponds to the following formula

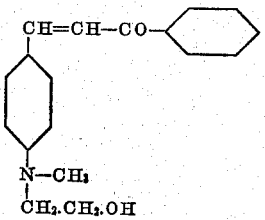

and dyes acetate artificial silk bright yellow shades of very strong greenish fluorescence.

*Example 8*

17.9 parts of p-N-hydroxyethyl-N-methyl-aminobenzaldehyde and 17.4 parts of 1-phenyl-3-methyl-5-pyrazolone are dissolved in 45 parts of alcohol and heated for several hours with reflux. The formed dyestuff is precipitated with water and several times digested with hot water. With the same result the formation of the dyestuff can be carried through by heating the components in glacial acetic acid. The dyestuff corresponds to the following formula

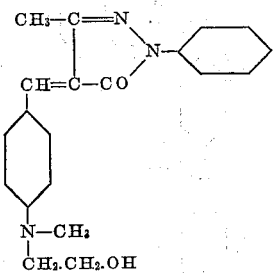

and dyes acetate artificial silk bright orange shades of good fastness properties.

When replacing the p-N-hydroxyethyl-N-methylaminobenzaldehyde by p-N-methyl-N-phenylaminobenzaldehyde a dyestuff is obtained which forms orange crystals melting at 193–194° C. The dyestuff corresponds to the following formula

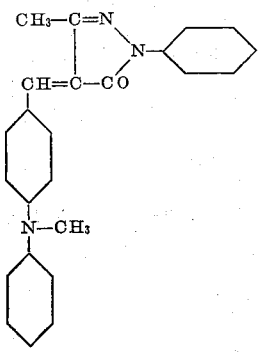

and dyes acetate artificial silk yellow orange shades of good fastness properties.

From p-N-methyl-N-phenylaminobenzaldehyde and 1-(2'-chlorophenyl)-3-methyl-5-pyrazolone a dyestuff is obtained which forms red crystals melting at 152–153° C. It corresponds to the following formula

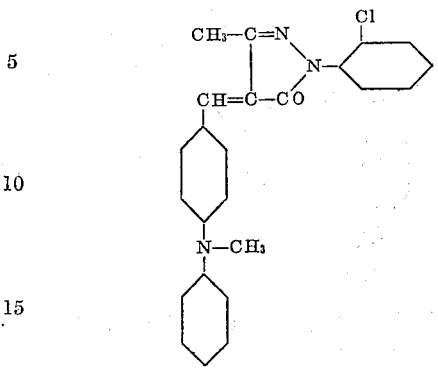

and is very similar to the preceding dyestuff in its tinctorial properties.

This application is in part a continuation of our copending application Serial Number 75,226 filed April 18, 1936, now U. S. Patent No. 1,179,895 dated Nov. 14, 1939.

We claim:

The dyestuff of the formula

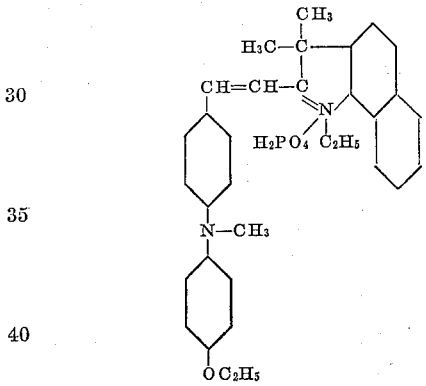

dyeing acetate artificial silk deep violet shades of very good fastness properties.

WERNER MÜLLER.
CARL BERRES.